(12) United States Patent
Hubbard

(10) Patent No.: US 7,177,902 B2
(45) Date of Patent: Feb. 13, 2007

(54) REMOTELY CONTROLLING A COMPUTER VIA SIMULATED KEYBOARD EVENTS

(75) Inventor: Thomas Hubbard, Woburn, MA (US)

(73) Assignee: Nokia, Inc., Irving, TX (US)

( * ) Notice: Subject to any disclaimer, the term of this patent is extended or adjusted under 35 U.S.C. 154(b) by 718 days.

(21) Appl. No.: 10/034,260

(22) Filed: Dec. 28, 2001

(65) Prior Publication Data

US 2003/0122856 A1  Jul. 3, 2003

(51) Int. Cl.
*G06F 15/16* (2006.01)
(52) U.S. Cl. .................. 709/203; 217/218; 217/246; 217/249; 715/773
(58) Field of Classification Search ................. 709/200
See application file for complete search history.

(56) References Cited

U.S. PATENT DOCUMENTS

| 5,805,157 | A | 9/1998 | Bertram et al. |
| 6,088,368 | A | 7/2000 | Rubinstain et al. |
| 6,104,700 | A | 8/2000 | Haddock et al. |
| 6,169,538 | B1 | 1/2001 | Nowlan et al. |
| 6,169,734 | B1 | 1/2001 | Wilson |
| 6,286,003 | B1* | 9/2001 | Muta ........................... 707/10 |
| 6,501,464 | B1 | 12/2002 | Cobbley et al. |
| 6,677,933 | B1* | 1/2004 | Yogaratnam ................. 345/174 |
| 2002/0002635 | A1* | 1/2002 | Astala et al. ............... 709/328 |
| 2002/0072395 | A1 | 6/2002 | Miramontes |
| 2003/0023671 | A1* | 1/2003 | Abdulrahiman et al. .... 709/203 |
| 2003/0040340 | A1* | 2/2003 | Smethers .................... 455/566 |

FOREIGN PATENT DOCUMENTS

WO  WO 00/78081 A1  12/2000

* cited by examiner

*Primary Examiner*—Yves Dalencourt
(74) *Attorney, Agent, or Firm*—Banner & Witcoff, Ltd.

(57) ABSTRACT

A keyboard event server (KES) allows an end user to remotely control a computer. The KES accepts a uniform resource locator having a query string that specifies one or more keyboard events to be simulated. The query string may include mnemonics corresponding to one or more keyboard-key presses that can be simulated one after another and/or simultaneously. An end user can use a wireless-access browser running on a wireless-client device to remotely control a target computer through a wireless-access gateway.

27 Claims, 4 Drawing Sheets

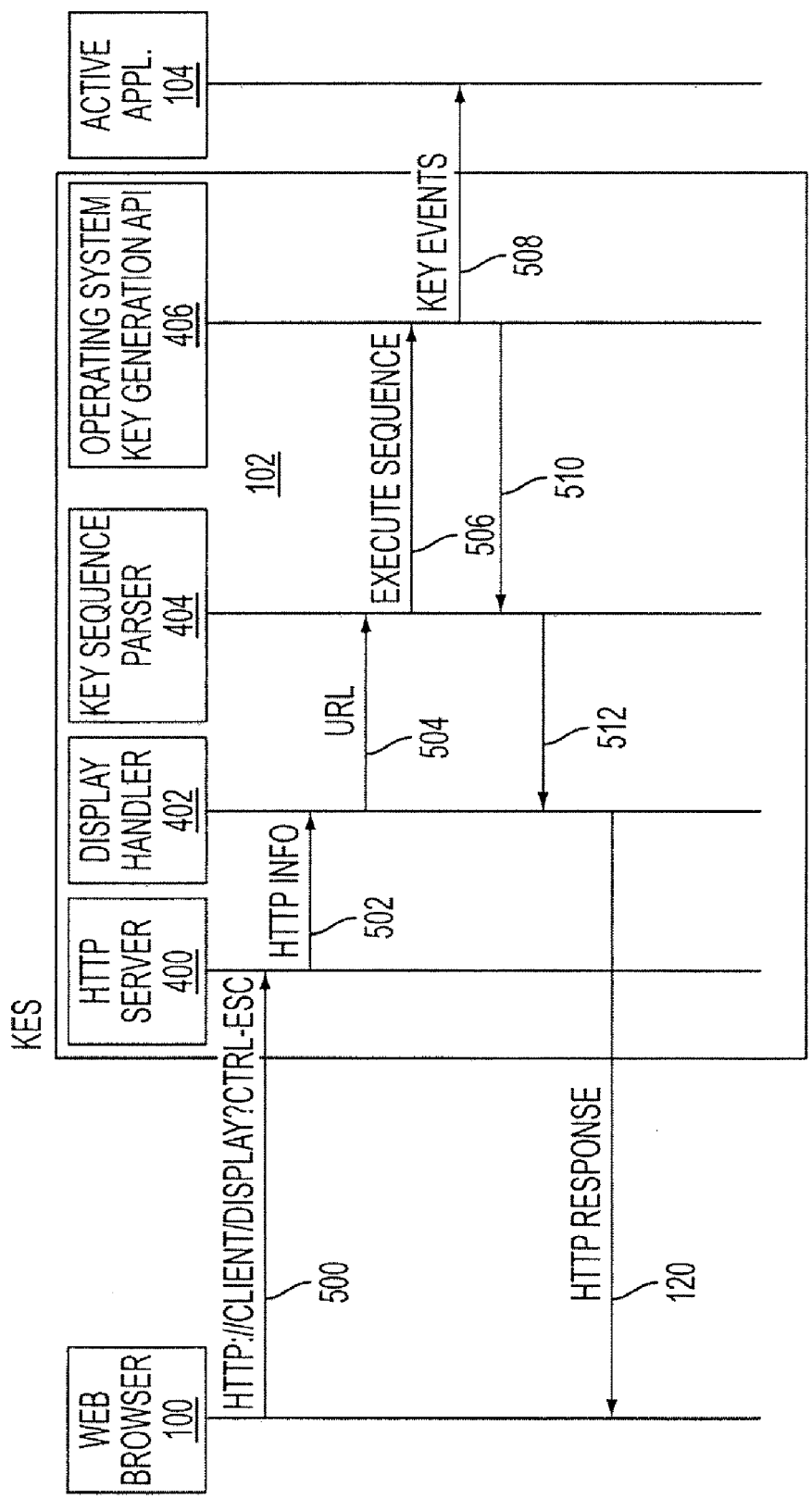

REMOTELY CONTROLLING A COMPUTER VIA SIMULATED KEYBOARD EVENTS

FIELD OF THE INVENTION

This invention relates generally to remotely controlling a target computer and relates more particularly to remotely controlling a target computer by simulating keyboard events.

BACKGROUND OF THE INVENTION

Conventional techniques for remotely controlling a computer tend to be relatively heavy-weight applications that require transferring relatively large amounts of video data, such as screen shots or a video representation of a user's "desktop." For instance, PCAnywhere is a software product of this type that allows a person to use one computer to remotely control another computer. Client-server software is also available from Citrix Systems of Fort Lauderdale, Fla. These types of remote-control software often undesirably require a specialized scripting environment, such as Java Script, and/or specialized communication protocols.

Due to the relatively large amounts of data transferred from the computer being controlled to the remotely controlling computer, these conventional remote-control techniques are not well suited to remotely controlling a computer via a wireless client device, such as a Wireless Application Protocol (WAP) phone or personal digital assistant (PDA).

A light-weight server that transfers a relatively small amount of data between a computer being remotely controlled and the remotely controlling computer and that uses standard unmodified web browsers, such as standard HTTP web browsers and/or Wireless Application Protocol (WAP) browsers, would therefore be desirable.

SUMMARY OF THE INVENTION

In accordance with an illustrative embodiment of the invention, a keyboard event server allows an end user to remotely control a computer. The keyboard event server (KES) accepts a uniform resource locator (URL) having a query string that specifies keyboard events to be simulated. The query string may include mnemonics corresponding to one or more keyboard-key presses that can be simulated one after another and/or simultaneously.

A keyboard event server (KES) in accordance with various illustrative embodiments of the invention can be used to remotely control presentation software running on a target computer. By using KES, a person—also referred to as an end user—can remotely control a target computer by interacting with a set of one or more web pages that allow the person to specify one or more keyboard events to be simulated. Using a wireless-client device to remotely control presentation software advantageously provides the person making the presentation the freedom to move around instead of having to stay near the person's computer during the presentation.

An illustrative embodiment of the invention is directed to a method of allowing a target computer to be remotely controlled through a browser. This method includes: accepting a connection from the browser; downloading to the browser a web page containing remote-control user-interface elements; receiving a message generated in response to a user interacting with at least one of the remote-control user-interface elements, wherein the message indicates at least one keyboard event to be simulated on the target computer; and simulating at least one keyboard event based on the received message.

The accepted connection may be an HTTP connection from a wireless-access gateway, such as a Wireless Application Protocol (WAP) gateway. The browser may be a wireless-access browser, such as a WAP browser. The wireless-access browser and the target computer may communicate through a wireless-access gateway. The remote-control user-interface elements may comprise virtual keyboard keys, hypertext markup language buttons, or wireless markup language select elements. The target computer may perform the accepting, downloading, receiving, and simulating. The received message may be contained in a query portion of an HTTP request. Simulating the at least one keyboard event may include sending an operating system key event to an active application on the target computer. Simulating the at least one keyboard event may include simulating a press-and-hold operation for at least a first key while simulating a press and then a release of at least a second key. The received message may be part of an HTTP POST.

An illustrative embodiment of the invention is directed to a method of using a wireless-access browser to remotely control a target computer. This method includes: using a wireless-access gateway to establish a wireless-access-browser connection to a keyboard event server running on the target computer; using the wireless-access browser to download from the keyboard event server a web page containing remote-control user-interface elements; and sending a message to the keyboard event server, wherein the message is generated in response to a user interacting with at least one of the remote-control user-interface elements and wherein the message indicates at least one keyboard event to be simulated by the keyboard event server on the target computer.

The remote-control user-interface elements may include wireless markup language select elements. The sent message may be contained in a query portion of an HTTP request. The sent message may be part of an HTTP POST.

An illustrative embodiment of the invention is directed to a method of allowing a wireless-access browser to remotely control a target computer. The method includes: establishing, through a wireless-access gateway, a wireless-access-browser connection to a keyboard event server running on the target computer; downloading through the wireless-access gateway from the keyboard event server to the wireless-access browser a web page containing remote-control user-interface elements; converting a wireless protocol-encoded (WP-encoded) message received from the wireless-access browser at the wireless-access gateway into an HTTP message, wherein the WP-encoded message is generated in response to a user interacting with at least one of the remote-control user-interface elements and wherein the WP-encoded message indicates at least one keyboard event to be simulated by the keyboard event server on the target computer; and transmitting the HTTP message from the wireless-access gateway to the keyboard event server.

The following steps may also be performed: receiving an HTTP response from the keyboard event server at the wireless-access gateway; converting the HTTP response to a WP-encoded response; and transmitting the WP-encoded response from the wireless-access gateway to the wireless-access browser.

Various illustrative embodiments of the invention are directed to computer-readable media having computer-executable instructions for performing steps recited above.

Further illustrative embodiments include a KES-compatible mobile terminal, and a remote-control system that includes such a mobile terminal.

BRIEF DESCRIPTION OF THE DRAWINGS

FIG. 5 depicts KES internal messaging in accordance with an illustrative embodiment of the invention.

DETAILED DESCRIPTION OF THE INVENTION

In accordance with an illustrative embodiment of the invention, a keyboard event server allows an end user to remotely control a computer. The keyboard event server (KES) accepts a uniform resource locator (URL) having a query string that specifies keyboard events to be simulated. The query string may include mnemonics corresponding to one or more keyboard-key presses that can be simulated one after another and/or simultaneously. For instance, pressing and holding the "ALT" key while pressing and releasing the "F" key, which will cause certain application programs to access a File drop-down menu, is an example of simulating simultaneous key presses. After simulating ALT-F in this manner, a letter "O" key press could be simulated to effectively select an Open drop-down menu selection. This simulated O key press is an example of a key press occurring after the simulated ALT-F key press. The mnemonic string ALT-F+O could be sent to the KES to specify that the KES should simulate an ALT-F key press followed by a letter O key press.

A keyboard event server (KES) in accordance with various illustrative embodiments of the invention can be used to remotely control presentation software running on a target computer. By using KES, a person—also referred to as an end user—can remotely control a target computer by interacting with a set of one or more web pages that allow the person to specify one or more keyboard events to be simulated. For instance, presentation software running on the target computer could be started and controlled by the end user to advance to the next slide of a presentation.

A keyboard event server (KES) in accordance with various illustrative embodiments of the invention can be used by an instructor to train a user of an application program or operating system without the instructor taking control of a computer's keyboard.

A person performing system-administration functions could use a keyboard event server (KES), in accordance with various illustrative embodiments of the invention, to access multiple server computers without having to connect a keyboard to each server.

In addition to the examples above, a keyboard event server (KES) in accordance with various illustrative embodiments of the invention can be advantageously used in any situation in which an end user can see the display of a computer to be controlled, but does not have convenient access to a keyboard for that computer. For example, such a KES could be used to allow an end user to control a computer-based kiosk via a wireless-access-client device.

Figure 1:
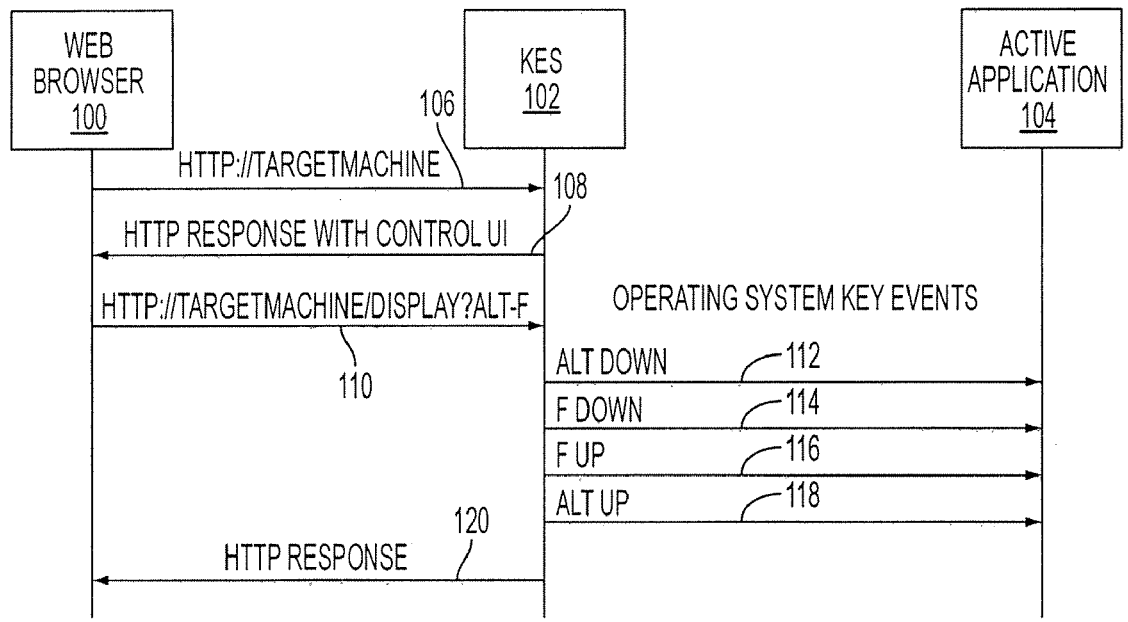
FIG. 1 depicts high level messaging between a web browser, a keyboard event server (KES), and an active application program, which is executing on a target computer, in accordance with an illustrative embodiment of the invention.
Figure 2:
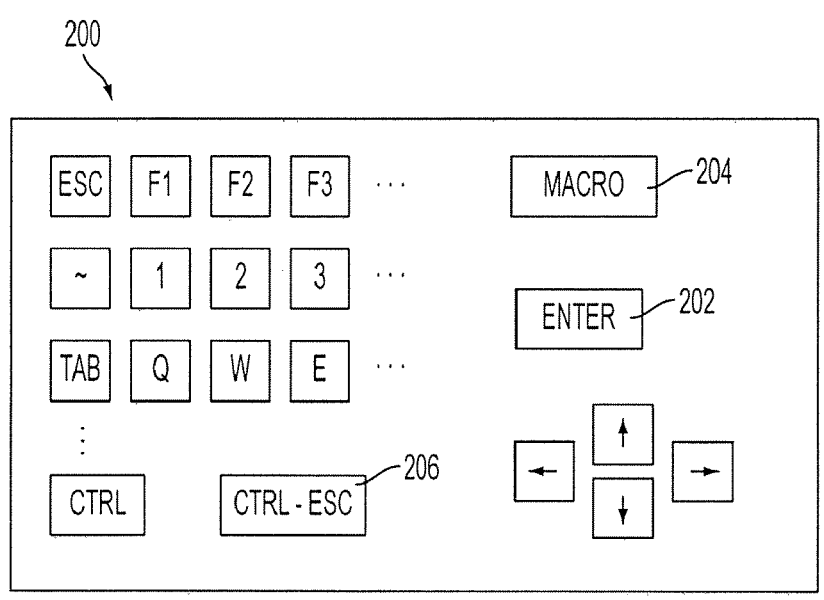
FIG. 2 shows an exemplary web page containing remote-control user-interface elements in the form of a virtual keyboard in accordance with an illustrative embodiment of the invention.

FIG. 1 depicts high level messaging, in accordance with an illustrative embodiment of the invention, between a web browser 100, a keyboard event server (KES) 102, and an active application program 104, which is executing on a target computer. The target computer may be implemented with a desktop computer, mobile terminal, personal digital assistant, or any other suitable computer device. The web browser 100 connects to the KES 102, as indicated by the arrow 106, which is labeled http://Targetmachine. In response, the KES 102, or any other server computer, downloads a web page containing remote-control user-interface elements, as indicated by arrow 108, which is labeled Http response with control UI. Portions of an exemplary control page 200 are shown in FIG. 2. The control page 200 could be a web page having virtual keyboard keys that, when selected, would send a KES event to the KES 102. Such a KES event could be a string of virtual keyboard presses that gets sent to the KES 102 upon the virtual Enter key 202 being activated or selected.

KES events can be grouped together. This allows a single hypertext markup language (HTML) button, wireless markup language (WML) select element, or the like to simulate multiple keyboard-key presses either simultaneously or one after another or any combination including both simultaneous and successive key presses. For instance, selecting key 206, which is labeled CRTRL-ESC, could cause the KES 102 to simulate holding the CTRL key down while depressing the ESC key on the target machine. A virtual key, such as key 204, could trigger a series of keyboard events on a target computer. Triggering such a series of keyboard events is similar to executing a macro in word processing software. In one embodiment, a user of web browser 100 can create and edit at least some of the macros. One or more of the macros may be stored locally to the computer hosting the browser.

Sets of KES events could cause a generic action to take place on the target computer. For example, for use with a target computer that is running a Windows®-based operating system, a single remote-control user-interface button could be used for launching or starting PowerPoint® presentation software. The button could be labeled "Start PowerPoint" and could generate a KES event string that would simulate the following keyboard events on the target computer: pressing CTRL-ESC to activate the Start button of the target computer's task bar, moving, via up-arrow-key presses to the program menu, navigating with additional arrow-key presses, to a PowerPoint® entry on the Start Programs menu, and pressing the Enter key to start the PowerPoint® presentation program.

The browser 100 may send to the KES 102 a string of mnemonics that represent keyboard events to be simulated. The KES 102 could then parse the string to extract a list of mnemonics. Each mnemonic could correspond to one or more keyboard events to be simulated on the target computer. An exemplary mnemonic-string syntax is discussed below. The KES 102 may be implemented entirely on the target computer, or may have various functional sub-components implemented on a computer other than the target computer. Functional sub-components of an exemplary embodiment of the KES 102 are discussed below.

The KES 102 may simulate a keyboard event on the target machine by calling low-level functions provided by an operating system running on the target computer. In this manner, the KES 102 can provide operating system key events, such as operating system key events 112–118, to an application program, such as active application 104, that is actively running on the target computer.

Referring back to FIG. 1, the HTTP response with control UI 108, may specify various remote-control user-interface elements and could come from either the KES or any other web server. After receiving the control UI web page, in response to an end user activating one or more user-interface buttons, activating one or more macros, or otherwise interacting with the control page, the Web browser 100 sends one or more KES events to the KES 102. Arrow 110 in FIG. 1 depicts the web browser 100 sending an example KES event, ALT-F, to the KES 102. Holding the ALT key and depressing the "F" key will activate the file menu of certain Windows®-based application programs running on the target computer. ALT-F appears in the query portion of the HTTP request 110. The query portion is the portion following the question mark.

Upon receiving the HTTP request 110 with KES mnemonics in the query string, the KES 102 parses the list of keyboard events and simulates occurrence of the keyboard events on the target machine, also referred to as the target computer. The KES 102 may pass the simulated keyboard events to an active application 104, as indicated by arrows 112–118. The KES 102 then returns an HTTP response 120 to the web browser 100.

Figure 3:
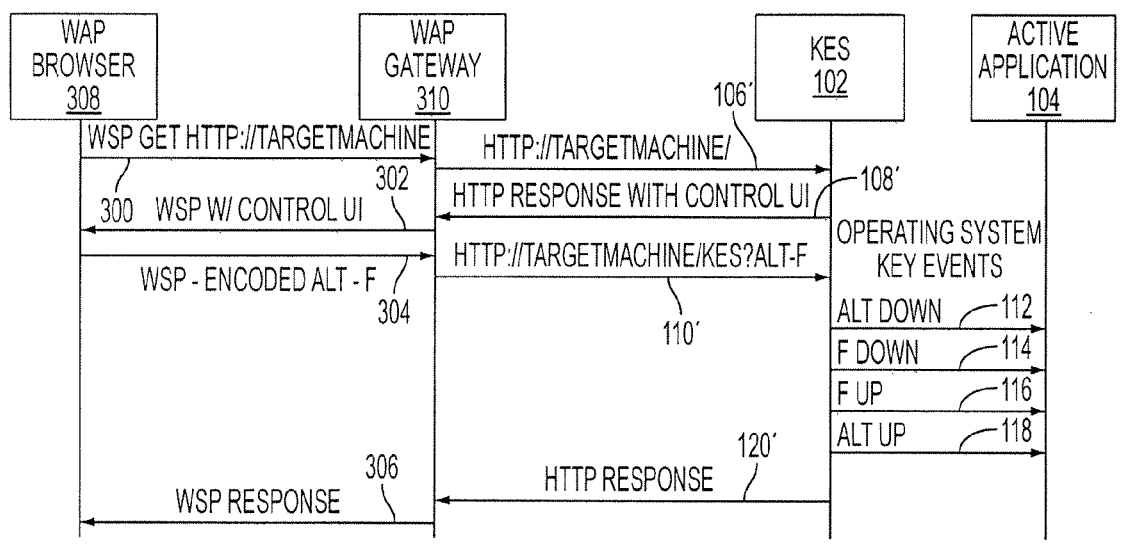
FIG. 3 depicts high-level messaging between a wireless-access browser, a wireless-access gateway, a KES, and an active application in accordance with an illustrative embodiment of the invention.

FIG. 3 depicts high-level messaging, in accordance with an illustrative embodiment of the invention, between a wireless-access browser, such as Wireless Access Protocol (WAP) browser 308; a wireless-access gateway, such as Wireless Access Protocol (WAP) gateway 310; the KES 102; and the active application 104. WAP browser 308 may run on a mobile terminal, such as a cellular telephone, a personal digital assistant, a handheld computer, and the like. The messaging between the KES 102 and the active application 104 is essentially the same as the messaging between these elements discussed above in connection with FIG. 1.

The messaging between the WAP browser 308 and the KES 102 is analogous to the messaging between the web browser 100 and the KES 102 discussed above. The WAP browser 308 however communicates with the KES 102 through the WAP gateway 310. Communications 300–306 between the WAP browser and the WAP gateway may use a wireless protocol, such as wireless session protocol (WSP). While relaying messages from the WAP browser 308 to the KES 102, the WAP gateway 310 transforms a binary version of HTTP into standard textual HTTP. Similarly, while relaying messages from the KES 102 to the WAP browser 308, the WAP gateway 310 may transform standard textual HTTP into a binary version of HTTP. Depending upon the capabilities of the WAP gateway 310 and/or the types of acceptable response messages specified by the WAP browser 308, the KES 102 may return either HTML or WML pages. The WAP browser 308 can specify acceptable response types by sending a header message through the WAP gateway 310 to the KES 102.

Figure 4:
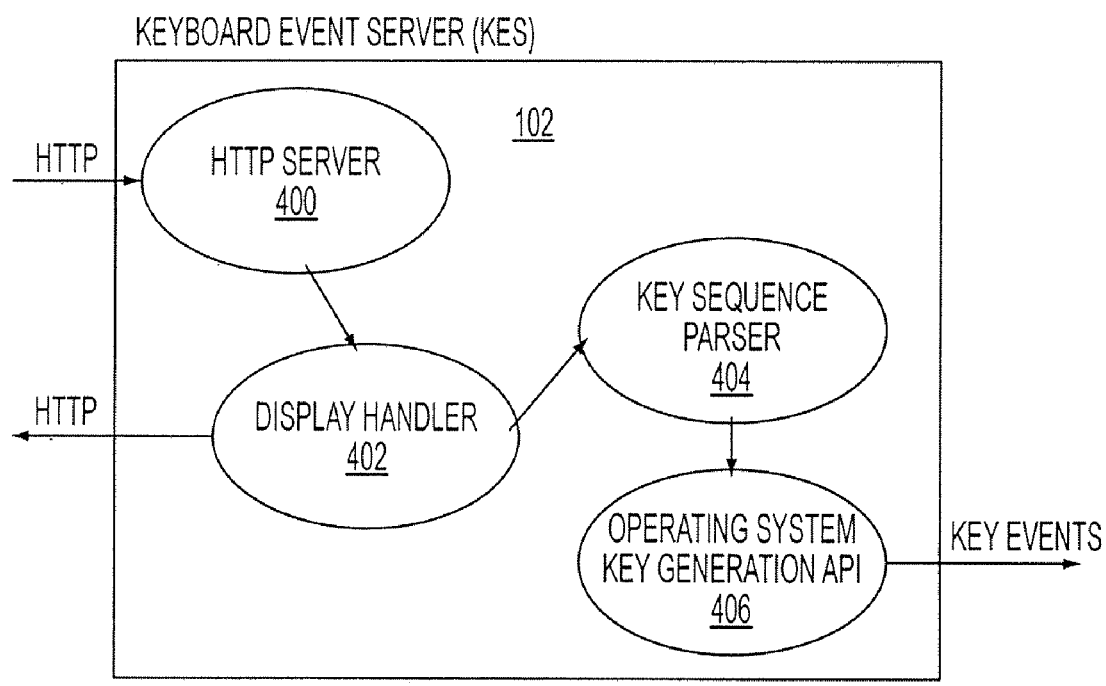
FIG. 4 depicts exemplary functional components of a KES in accordance with an illustrative embodiment of the invention.

FIG. 4 depicts exemplary functional sub-components of the KES 102 in accordance with an illustrative embodiment of the invention. An HTTP Server 400 handles incoming HTTP connections from a web browser. The HTTP Server 400 may run on TCP/IP port 80 of the target machine. The HTTP Server 400 may strip away superfluous HTTP headers and pass to the Display Handler 402: the target URL requested; the acceptable response types, such as text/HTML or text/WML; a communication socket to the web browser or WAP Gateway; and the HTTP method that was used by the web browser or WAP Gateway, such as GET or POST.

The Display Handler 402, Key Sequence Parser 404, and Operating System Key Generation API 406 parse the target URL, execute key sequences on the target machine, respond to status inquiry messages from a client, respond to Stop commands from the client, and display an optional help page to help KES users use correct URL syntax. When the Display Handler 402 finds a key sequence in the target URL, such as ALT-F, the Display Handler 402 calls the Key Sequence Parser 404 to parse the key sequence. The Key Sequence Parser 404 in turn calls the Operating System Key Generation API 406 to execute the key sequence on the target machine.

In accordance with an illustrative embodiment of the invention, there are four URLs intrinsic to the KES 102 that control behavior: "/","/display?", "/status", and "/exit." The root or "/" shows the main menu for the KES 102, this main menu is the control page for the KES 102. Other KES functions are available from the main menu. The "/display?" URL contains the query portion of the HTTP request that is interpreted as a key sequence to be run on the target machine. The "/status" URL shows the current status of the KES server 102, such as statistics and logged errors. Finally, "/exit" exits the KES server.

FIG. 5 depicts KES internal messaging in accordance with an illustrative embodiment of the invention. As depicted by arrow 500, the web browser makes a connection to the KES server and sends a URL containing "/display?ctrl-esc" in the query portion. The HTTP Server component 400 accepts the HTTP message, parses out relevant HTTP information such as URL, HTTP Method, and acceptable content types for responses. The HTTP Server 400 passes the HTTP information to the Display Handler 402, as depicted by arrow 502.

Upon detecting that a "/display" URL was requested, the Display handler passes the URL, including the query portion, to the Key Sequence Parser 404, as depicted by arrow 504. The Key Sequence Parser 404 recursively parses the key sequence and calls the Operating System Key Generation API 406 to pass simulated key events to the active application 104, as depicted by arrows 506 and 508, respectively. The Operating System Key Generation API 406 may make platform-specific function calls while sending the key events to the active application 104.

The Operating System Key Generation API 406 finishes executing and returns to the key sequence parser 404, which in turn finishes executing and returns to the display handler 402. The display handler 402 then returns an HTTP result 120 back to the web browser 100.

A format of the query part of a URL in accordance with an illustrative embodiment of the invention is:
QUERY=KEY|KEYSEQUENCE*
KEYSEQUENCE=KEY+[('+'|'-')+KEY+'+']
KEY= "LMOUSE"
  "RMOUSE"
  "ControlBreak"
  "MMOUSE"
  "BACKSPACE"
  "TAB"
  "CLEAR"
  "RETURN"

"SHIFT"
"CTRL"
"ALT"
"PAUSE"
"CAPSLOCK"
"ESC"
"SPACEBAR"
"PAGEUP"
"PAGEDOWN"
"END"
"HOME"
"LEFTARROW"
"UPARROW"
"RIGHTARROW"
"DOWNARROW"
"PRINTSCREEN"
"INS"
"DEL"
"HELP"
"F1"
"F2"
"F3"
"F4"
"F5"
"F6"
"F7"
"F8"
"F9"
"F10"
"F11"
"F12"
"NUMLOCK"
"SCROLLLOCK"
"LSHIFT"
"RSHIFT"
"LCONTROL"
"RCONTROL"
"LMENU"
"RMENU"

In accordance with an illustrative embodiment of the invention, each of the KEYs above is a Windows® Virtual Keycode. The plus symbol, '+,' is used to indicate that a key is to be pressed and released and then followed by the next key in the sequence. For example, to send the key sequence 'BAD' to an active application, the following query string can be sent, B+A+D. An alternative way to send a string is to send the entire string. For example, to send the sequence 'BAD', the string "BAD" could be sent.

The dash symbol, '-,' is used to indicate that the first key in the sequence should be pressed and held down while the second key in the sequence is pressed and released. For example, the key sequence that corresponds to holding down the CTRL key while at the same time pressing and releasing the ESC key is CTRL-ESC.

An HTTP request to the KES 102 may be implemented with an HTTP GET or an HTTP POST. The arguments of an HTTP POST are typically not cached. HTTP permits POST'ing to a URL with a query string. This allows for preserving the KES syntax set forth above. When a POST method is used, the KES syntax can be sent as part of a URL query string or as the payload of an HTTP POST method. The control pages may have a relatively long cache life—for instance approximately no less than an average amount of time that elapses between installing new application programs onto the target machine—to reduce the amount of refreshes of the control page. Reducing the number of refreshes of content is advantageous for low bandwidth devices, such as WAP-client devices because, doing so reduces the amount of over-the-air traffic.

A KES 102 in accordance with an illustrative embodiment of the invention may turn off key interruptions before sending a sequence of keys to an active application 104 running on a Windows®-based target machine. For example, to send the sequence ALT-F, the KES 102 may turn off key interruptions and then send virtual key codes to simulate the following keyboard events: an ALT virtual key code DOWN, an F virtual key code down, an F virtual key code UP, and an ALT virtual key code UP. The following portions of computer code illustrate an exemplary implementation of such a key code sequence.

```
// send a simultaneous key sequence e.g. ALT-F
byte keyA=0,
    keyB=0;
// Key A and B represent the first and second key in the
    sequence repectively.
// INPUT is a Microsoft-defined datatype.
INPUT input[4];
// keyA down
input[0].type=INPUT_KEYBOARD;
input[0].ki.dwExtraInfo=0;
input[0].ki.dwFlags=0;
input[0].ki.time=0;
input[0].ki.wScan=MapVirtualKey(keyA, 0);
input[0].ki.wVk=keyA;
// keyB down
input[1].type=INPUT_KEYBOARD;
input[1].ki.dwExtraInfo=GetMessageExtraInfo( );
input[1].ki.dwFlags=0;
input[1].ki.time=0;
input[1].ki.wScan=MapVirtualKey(keyB, 0);
input[1].ki.wVk=keyB;
// keyB UP
input[2].type=INPUT_KEYBOARD;
input[2].ki.dwExtraInfo=GetMessageExtraInfo( );
input[2].ki.dwFlags=KEYEVENTF_KEYUP;
input[2].ki.time=0;
input[2].ki.wScan=MapVirtualKey(keyB, 0),
input[2].ki.wVk keyB;
// keyA UP
input[3].type INPUT_KEYBOARD;
input[3].ki.dwExtraInfo=0;
input[3].ki.dwFlags=KEYEVENTF_KEYUP;
input[3].ki.time=0;
input[3].ki.wScan=MapVirtualKey(keyA, 0);
input[3].ki.wVk=keyA;
// Use send input so that the sequence will not be interrupted.
//
SendInput(4, input, sizeof(INPUT));
```

The invention has been described with respect to various illustrative embodiments including presently preferred modes of carrying out the invention. Those skilled in the art will appreciate that there are numerous variations and permutations of the systems and techniques described above that fall within the spirit and scope of the invention as set forth in the appended claims.

I claim:

1. A method of allowing a target computer to be remotely controlled through a browser, the method comprising:
    accepting a connection from the browser, wherein the browser is executed by a wireless-client device;
    downloading to the browser a web page containing remote-control user-interface elements, wherein the remote-control user-interface elements include virtual keyboard keys that are displayed by the browser, wherein a user activating at least one of the virtual keyboard keys causes a message to be sent to the target computer, wherein the message specifies at least one keyboard event to be simulated on the target computer, wherein the at least one keyboard event to be simulated is based upon which of the virtual keyboard keys was activated;

receiving the message that specifies the at least one keyboard event to be simulated on the target computer; and simulating the at least one keyboard event specified by the received message.

2. The method of claim 1, wherein the accepted connection is an HTTP connection from a wireless-access gateway.

3. The method of claim 1, wherein the browser is a wireless-access browser.

4. The method of claim 3, wherein the wireless-access browser and the target computer communicate through a wireless-access gateway.

5. The method of claim 1, wherein the remote-control user-interface elements comprise hypertext markup language buttons.

6. The method of claim 1, wherein the remote-control user-interface elements comprise wireless markup language select elements.

7. The method of claim 1, wherein the accepting, the downloading, the receiving, and the simulating are each performed by the target computer.

8. The method of claim 1, wherein the received message is contained in a query portion of an HTTP request.

9. The method of claim 1, wherein simulating the at least one keyboard event comprises sending an operating system key event to an active application on the target computer.

10. The method of claim 1, wherein simulating the at least one keyboard event comprises simulating a press-and-hold operation for at least a first key while simulating a press and then a release of at least a second key.

11. The method of claim 1, wherein the received message is part of an HTTP POST.

12. A method of using a wireless-access browser to remotely control a target computer, the method comprising:
connecting to a wireless-access gateway to establish a wireless-access-browser connection to a keyboard event server running on the target computer;
using the wireless-access browser to download from the keyboard event server a web page containing remote-control user-interface elements, wherein the wireless-access browser is executed by a wireless-client device and wherein the remote-control user-interface elements include wireless markup language select elements that are displayed by the wireless-access browser, wherein a user activating at least one of the wireless markup language select elements causes a message to be sent to the keyboard event server, wherein the message specifies at least one keyboard event to be simulated by the keyboard event server on the target computer, wherein the at least one keyboard event to be simulated is based upon which of the at least one wireless markup language select elements was activated; and
sending to the keyboard event server the message that specifies the at least one keyboard event to be simulated by the keyboard event server on the target computer.

13. The method of claim 12, wherein the remote-control user-interface elements comprise virtual keyboard keys.

14. The method of claim 12, wherein the sent message is contained in a query portion of an HTTP request.

15. The method of claim 14, wherein the sent message is part of an HTTP POST.

16. A method of allowing a wireless-access browser to remotely control a target computer, the method comprising:
establishing, through a wireless-access gateway, a wireless-access-browser connection to a keyboard event server running on the target computer;
downloading through the wireless-access gateway from the keyboard event server to the wireless-access browser a web page containing remote-control user-interface elements, wherein the wireless-access browser is executed by a wireless-client device and wherein the remote-control user-interface elements include wireless markup language select elements that are displayed by the wireless-access browser, wherein a user activating at least one of the wireless markup language select elements causes a wireless protocol-encoded (WP-encoded) message to be sent to the wireless-access gateway, wherein the WP-encoded message specifies at least one keyboard event to be simulated by the keyboard event server on the target computer, wherein the at least one keyboard event to be simulated is based upon which of the at least one wireless markup language select elements was activated;
converting the wireless protocol-encoded (WP-encoded) message received from the wireless-access browser at the wireless-access gateway into an HTTP message; and
transmitting the HTTP message from the wireless-access gateway to the keyboard event server.

17. The method of claim 16, further comprising:
receiving an HTTP response from the keyboard event server at the wireless-access gateway;
converting the HTTP response to a WP-encoded response; and
transmitting the WP-encoded response from the wireless-access gateway to the wireless-access browser.

18. A computer-readable medium having computer-executable instructions for causing a wireless-access gateway to perform the steps recited in claim 17.

19. A computer-readable medium having computer-executable instructions for causing a target computer to perform the steps recited in claim 4.

20. A computer-readable medium having computer-executable instructions for causing a wireless-access browser to perform the steps recited in claim 15.

21. A mobile terminal that allows an end user to remotely control a target computer, the mobile terminal comprising:
a wireless-access browser that downloads, from a keyboard event server that is executing on the target computer, remote-control user-interface elements that include wireless markup language select elements that are displayed by the wireless-access browser and that, upon user activation, cause the mobile terminal to send to the keyboard event server a message that specifies at least one keyboard event to be simulated by the keyboard event server on the target computer, wherein the at least one keyboard event to be simulated is based upon which of the at least one wireless markup language select elements was activated; and
wherein, the mobile terminal sends to the keyboard event server the message that specifies at least one keyboard event to be simulated by the keyboard event server on the target computer.

22. The mobile terminal of claim 21, wherein the wireless-access browser and the target computer communicate through a wireless-access gateway.

23. The mobile terminal of claim 21, wherein the remote-control user-interface elements comprise virtual keyboard keys.

24. The mobile terminal of claim 21, wherein the sent message is wireless-protocol encoded.

25. The mobile terminal of claim 21, wherein the at least one keyboard event to be simulated comprises simulating a press-and-hold operation for at least a first key while simulating a press and then a release of at least a second key.

26. A remote-control system comprising:
a wireless-access gateway;
a target computer that is running a keyboard event server and that is coupled to the wireless-access gateway;
a mobile terminal running a wireless-access browser that receives remote-control user-interface elements that include wireless markup language select elements that are displayed by the wireless-access browser and that, upon user activation, cause the mobile terminal to send to the wireless-access gateway a message that specifies at least one keyboard event to be simulated by the keyboard event server on the target computer, wherein the at least one keyboard event to be simulated is based upon which of the at least one wireless markup language select elements was activated; and
wherein the keyboard event server receives through the wireless-access gateway from the wireless-access browser the message that specifies the at least one keyboard event to be simulated; and the keyboard event server simulates on the target computer the at least one keyboard event specified by the message received through the wireless-access gateway.

27. The remote-control system of claim 26, wherein the message received through the wireless-access gateway comprises at least one mnemonic corresponding to the at least one simulated keyboard event.

* * * * *